Dec. 13, 1966 H. R. CHOPE 3,291,987
ALL-WEATHER THREE-DIMENSIONAL POSITION INDICATING SYSTEM
Filed April 8, 1963
2 Sheets-Sheet 1

INVENTOR.
Henry R. Chope
BY Charles M. Hutchins
ATTORNEY

Dec. 13, 1966  H. R. CHOPE  3,291,987
ALL-WEATHER THREE-DIMENSIONAL POSITION INDICATING SYSTEM
Filed April 8, 1963  2 Sheets-Sheet 2
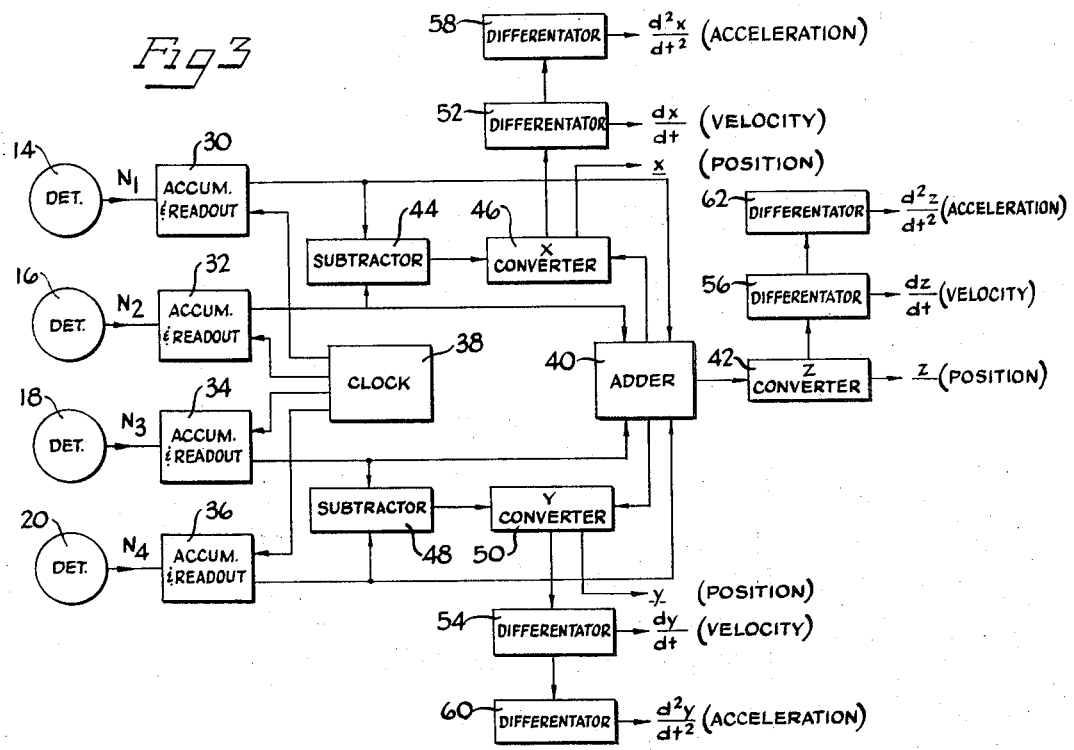
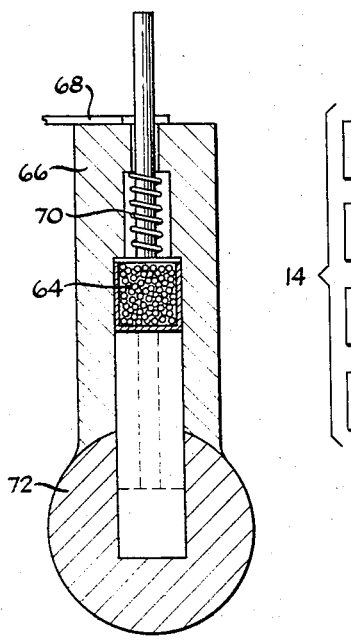
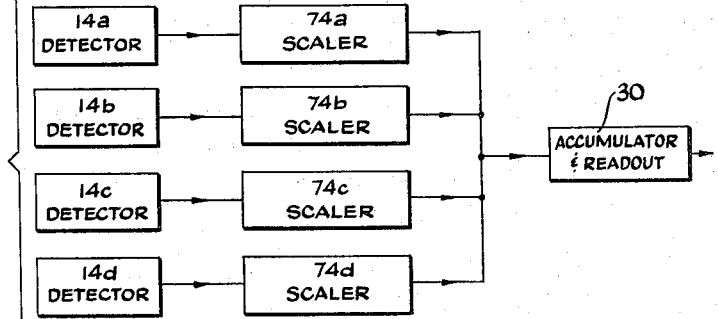
INVENTOR.
Henry R. Chope
BY Charles M. Hutchins
ATTORNEY United States Patent Office 3,291,987
Patented Dec. 13, 1966

3,291,987
ALL-WEATHER THREE-DIMENSIONAL POSITION INDICATING SYSTEM
Henry R. Chope, Columbus, Ohio, assignor to Industrial Nucleonics Corporation, a corporation of Ohio
Filed Apr. 8, 1963, Ser. No. 271,153
10 Claims. (Cl. 250—83.3)

This invention relates to a method and a system for fixing the position of an object located at some distance from a detection station. More particularly, it relates to a nuclear tracking system whereby the position of a missile is determined by measuring at a number of ground stations penetrative radiations produced by a radioactive source affixed to the missile.

For various aerospace applications, it is necessary to track accurately or fix the position of a moving vehicle such as a missile, which may be a rocket. In the past, this tracking has been achieved by radar, by Doppler ranging and by optical and infrared measurements. Radar and Doppler ranging are not acurate for short ranges or low velocity. Optical and infrared measurements are useful at short range at low velocities; however, they require fair weather. In many operations, it is necessary that the missile be accurately tracked during the early part of its trajectory, particularly in the first thousand feet.

It is, therefore, the primary object of the present invention to provide a tracking system which has capability for accurately tracking an object such as a missile during the initial parts of its trajectory. It is a further object of the invention to track or locate an object under all weather conditions particularly under weather conditions that would render optical tracking devices relatively useless. It is still another object to provide a system for tracking or fixing the position of a source of penetrative radiation. Other objects and advantages will be apparent from consideration of the following description taken in connection with the drawings in which:

FIGURE 3 is a block diagram of one form of the computer used in the system of FIGURE 1;

FIGURE 4 is a cross-sectional view of one form of a convertible source that may be used in the system of FIGURE 1; and FIGURE 5 is a block diagram of one form of detector unit that may be used in the system of FIGURE 1.

The present invention relates to a position indicating system and method, in particular for tracking a moving missile. The missile carries radioactive material emitting penetrative radiation, preferably gamma rays or bremsstrahlung. A fixed detector system, preferably on the ground, measures at least three properties of the penetrative radiation, preferably its intensity at at least three different points on the ground. The system produces respective independent signals corresponding to these properties. A computer takes these independent signals and from them computes the instantaneous position of the missile. The computer provides an indication of this position, which may be visual and is preferably provided as the three coordinates of a three dimensional coordinate system having a predetermined reference datum. The computer may also compute and indicate the instantaneous velocity or acceleration of the missile.

Figure 1:
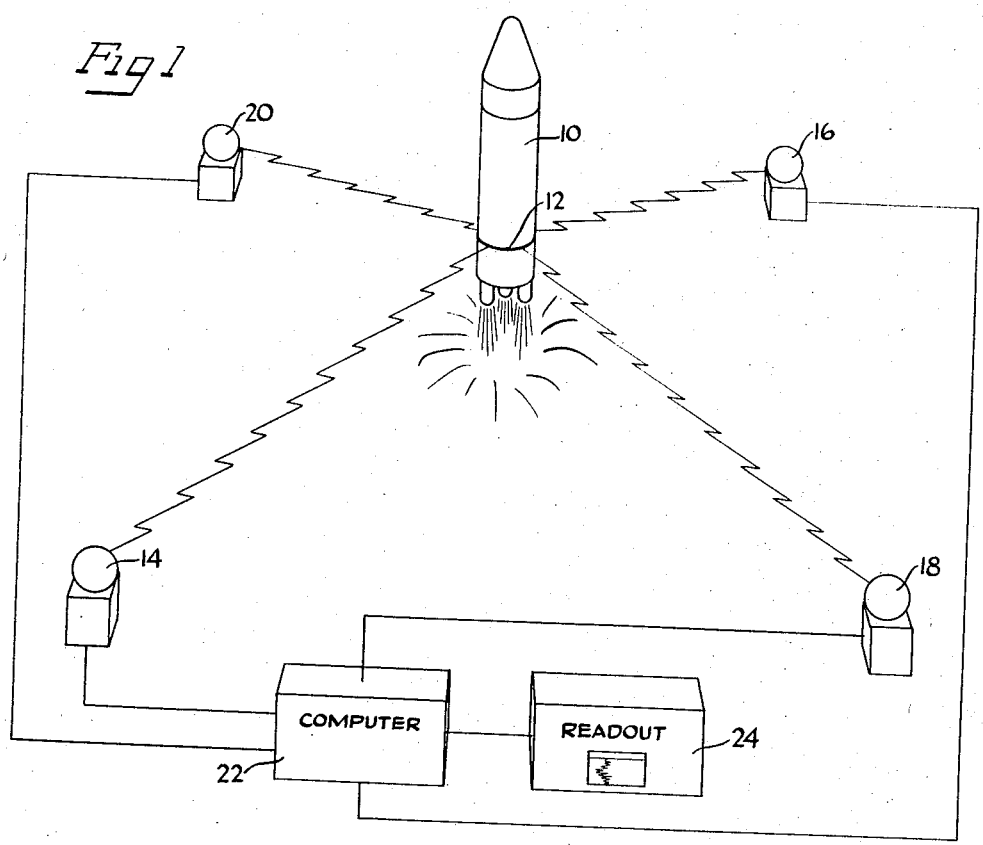
FIGURE 1 illustrates in perspective one form of the invention using four radiation detectors to measure the range of a missile.

FIGURE 1 shows the general layout of the system of the present invention. A missile 10 has a radioactive source 12 affixed thereto. This radioactive source 12 emits penetrative radiation. "Penetrative radiation," as used herein, refers to radiation penetrative of clouds and fog that is not capable of being focussed like light and infrared radiations. It includes gamma rays and bremsstrahlung. These rays go out in all directions from the source 12 and some are detected by each of detectors 14, 16, 18 and 20 located on the ground. Each of these detectors produces a signal systematically related to the intensity of the radiation detected thereby. The signals are produced simultaneously and are simultaneously applied to a computer 22 which may be in many respects similar to the computers utilized in earlier systems, such as optical systems. Computer 22 takes the information from each of the signals and makes a computation based upon triangulation principles to fix the position of the radioactive source and the missile relative to the fixed measuring system. These determinations of position are fed to a read-out device 24 which provides a visual indication or a record of the position of the missile at various times. The computer may also compute changes in position with respect to time, i.e., velocity, as well as changes in velocity, i.e., acceleration.

As is well known, three coordinates identify the position of a point in space. Although various coordinate systems are possible, it is preferable to use a cubic system in which $x$ and $y$ are the horizontal coordinates and $z$ is the vertical coordinate, or a spherical system in which $\theta$ is the azimuth, $\varphi$ is the elevation, and $r$ is the range. Conveniently, the origin of the coordinate system is the launching pad from which the missile is fired. To determine the three coordinates, it is necessary to make three separate measurements of the position of the source. That is, mathematical principles required three separate equations in order to solve for three unknowns. It will be noted that the system of FIGURE 1 utilizes four detectors and that four independent measurements are made. In some respects, the fourth measurement is unnecessary. However, each additional measurement adds to the accuracy of the system, providing a check upon the determinations made with but three measurements. Further, in a preferred form of this invention, the detectors are located at the corners of a square from the center of which the missile is fired. The system has particular utility for missiles that are fired principally verticaly during the initial trajectory with but a relatively small horizontal component. Under such conditions, the preferred layout of the detectors permits simplification of the computer 22.

Figure 2:
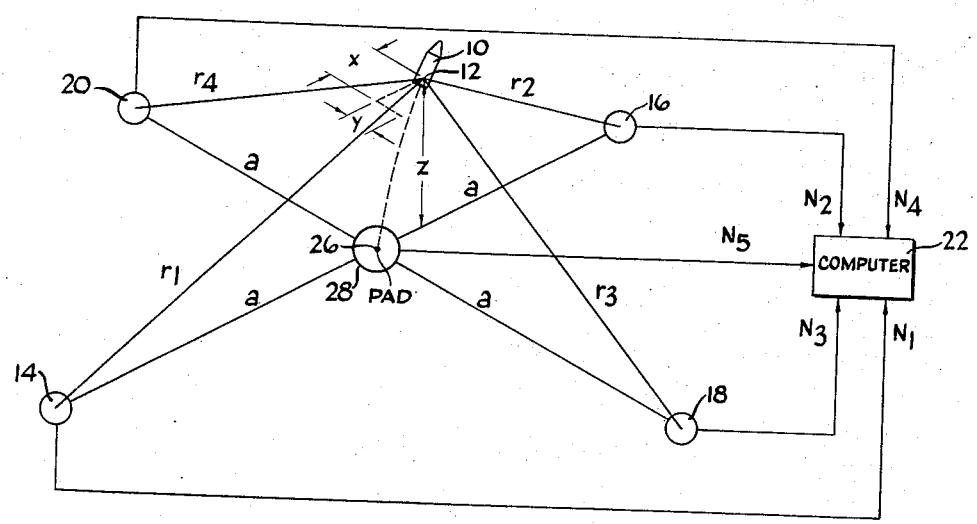
FIGURE 2 is a diagrammatic illustration of the apparatus of FIGURE 1 showing its geometry.

FIGURE 2 shows the geometry of a preferred embodiment of this invention. The detectors 14, 16, 18 and 20 are located in a horizontal plane at respective corners of a square, each the same distance $a$ from the center. The launching pad 26 whence the rocket is fired is located at this center. Pad 26 is taken as the origin of the coordinate system. The $x$ direction is the direction of the line joining diagonally opposite detectors 14 and 16, which may then be considered the $x$ detectors. The $y$ direction is that of the line joining diagonally opposite $y$ detectors 18 and 20, and the z direction is vertical. To determine a point in space, it is also necessary to know the location of the origin of the coordinate system and the directions of the coordinates from the terrestrial system. In other words, it is necessary to know the latitude and longitude of the system origin and the directions of the detectors therefrom relative to north. Of course, for measurements in the first thousand feet, measurements through the origin are sufficient without knowing its latitude and longitude. However, to project the measurements in order to determine where the missile is going in space, it will be necessary to know where on earth it started. For convenience, the $x$ detectors may be lined up east and west and the $y$ detectors north to south.

The source 12 may be made of a number of different radioactive materials. This source will be discussed at greater length below. For the moment, it is necessary to know only that the source is radioactive and emits penetrating radiations at random but at a substantially constant rate. The detectors may take a number of different forms. For example, they may be ionization chambers or scintillation counters. Scintillation counters produce a pulse for each radiation detected, the size of each pulse being related to the amount of the energy of the detected radiation that is lost in the sensitive element of the detector. On the other hand, an ionization chamber is an integrating device. It produces a direct current that is a measure of the rate at which energy is lost in the sensitive element of the detector. The number of signal pulses produced by a scintillation counter is, therefore, a measure of the true intensity of the radiation detected, that is, it is a measure of the rate at which radiation strikes the sensitive element of the detector. On the other hand, the ionization chamber measures the rate at which gamma ray energy is detected. For simplicity, the scintillation counter system will be explained; however, similar principles obtain with ionization chambers. In either case, the detection signal is uniquely related to the distance between the radioactive source and the detector. It is quite apparent that the farther away the source is from the detector, the smaller the detection signal in either case. Further, for each spacing there will be a particular detection signal, although it should be mentioned that the emission of gamma rays and the detection thereof are statistical processes and that a substantial number of processes must be sampled before the detection signal can be taken as accurate. Were the energy of the radiations all the same, the ionization chamber detection signal would be dependent substantially only on intensity and would have the same information as the scintillation counter detection signal. The energy of the gamma rays detected may change with distance as the gamma rays are degraded; however, the signals from each have a direct relation to the spacing between the source and the detector, and unless the context requires otherwise, the word "intensity" as used herein includes energy dependent phenomena as detected by ionization chambers.

The relationship between counting rate and distance for gamma radiation emitted from a point source may be stated as $$N = \frac{KS}{r^2} e^{-r/\lambda}$$

Where N is counting rate, S is source strength, $r$ is the distance from source to detector, $\lambda$ is the characteristic absorption distance and K is a geometrical factor including detector dimensions and efficiency. This classical relationship applies to the primary radiations emitted by the source. Where the detector detects not only primary radiation but also scattered radiation, the counting rate is higher because of what may be called a "build-up" factor occasioned by the scattering of gamma rays into the detector that were initially traveling in other directions.

It is apparent that the counting rate N is related to the distance or slant range $r$ by the so-called inverse square law, which is a geometrical factor, and by the exponential decline occasioned by absorption of the gamma rays by the air or other material intervening between the source and detector. Leaving statistical fluctuations aside for the moment, it is apparent that each counting rate corresponds to a particular slant range. Whatever the relationship between slant range and counting rate, it can be determined empirically and the empirical relationship fed into the computer. In any event, counting rate can be taken as a measure of slant range.

Returning to the particular preferred embodiment illustrated in FIGURE 2, the missile 10 is projected substantially vertically so that the $x$ and $y$ coordinates of the missile in its first thousand feet of flight are very much smaller than the distane $a$ of each of the detectors from the origin 26. The slant ranges $r_1$, $r_2$ $r_3$ and $r_4$ from detectors 14, 16, 18 and 20, respectively, are therefore all substantially the same and each is approximately $r = \sqrt{a^2 + z^2}$. Inasmuch as $a$ is constant, the determination of $r$ permits the determination of $z$; thus $z$ is a function of $r$ and hence a function of the counting rate. It may be noted, however, that to a certain extent the missile deviates from the vertical, else there would be no problem in locating it horizontally. Hence, the slant range from the respective detectors are slightly different. It may be noted, however, that as the missile moves horizontally toward one detector, it moves away from the opposite detector, and the average of the two is nearer the true value of $z$. Further, the average of the respective counting rates is more nearly indicative of the true $z$ than any single counting rate and provides a very close proximation to $z$ where the $x$ and $y$ deviation is not great relative to the slant range. Under such circumstances the average counting rate, or what is substantially the same thing, the total counting rate for all detectors, may be taken as a measure of the $z$ coordinate.

It may be noted that the determination of $z$ will be relatively inaccurate when $z$ is small relative to $a$. In other words, at lift-off and shortly thereafter the slant range is substantially equal to $a$ irrespective of the value of $z$. In order that $z$ may be determined accurately during the first few moments of flight, a fifth detector 28 may be disposed at the origin. The output of this detector may be used as a measure of $z$ for the initial portion of the flight.

The $x$ coordinate is a function of the difference in the slant ranges to the respective $x$ detectors 14 and 16 and hence to the difference in their counting rates. This is a geometrical relationship also influenced by the relationship between the slant range and the $z$ coordinate. The slant range and the $z$ coordinate having been determined as above, the computer 22 can introduce the slant range and the $z$ coordinate into the difference between the counting rates of detectors 14 and 16 and hence determine the $x$ coordinate. The $y$ coordinate can be similarly determined.

This system is explained in greater detail in connection with FIGURE 3. The respective detectors 14, 16, 18 and 20 are preferably scintillation counters each comprising a phosphor and a photomultiplier with an appropriate power supply and a suitable discriminator. The output of each detector passes to a respective accumulator and read-out circuit 30, 32, 34, and 36. These accumulator-read-out circuits may take various forms. In its preferred form, the accumulator includes a scaler and shift register. However, it may alternately include a capacitor upon which charges are accumulated or a rate meter. Where a rate meter is used, the output thereof may be used continuously. However, where the information is accumulated on a scaler or on a capacitor, provision is made for the accumulator signal to be read out periodically. To this end, a clock 38 provides periodic interrogation pulses to the respective accumulator and read-out circuits. Upon receipt of each interrogation pulse, the accumulator provides an output signal, indicative of the counts accumulated in the preceding measuring period, and the accumulator is discharged to begin a new measuring cycle. A convenient circuit for achieving this includes a pair of capacitors. The signal pulses from the respective detectors are caused to provide a uniform charge for each pulse. These charges are accumulated on one capacitor until the interrogation pulse arrives, whereupon the charge on that capacitor is used to derive an output voltage, as with a vacuum tube volt meter, and the other capacitor is switched into the circuit to accumulate charges. At the time of the next interrogation pulse, the first capacitor is discharged and switched back into the accumulator circuit, while the voltage accumulated on the second capacitor is read out. The outputs of the respective accumulator and read-out circuits are all combined in adder 40 and applied to a $z$ converter 42 which includes the empirically determined conversion factors converting the average counting rate related to slant range into an indication of the $z$ coordinate.

At the same time, the outputs of accumulator and read-out circuits 30 and 32 are subtracted by a subtractor 44. The output of subtractor 44 is combined with an output of adder 40 in $x$ converter 46, which includes the empirical factors and the geometrical relationship necessary to derive an indication of the $x$ coordinate. Similarly the signals from accumulator and read-out circuits 34 and 36 are subtracted by a subtractor 48, and the difference in signals is combined with an output of adder 40 in $y$ converter 50 to derive an indication of the $y$ coordinate.

The outputs of the respective $x$, $y$, and $z$ converters 46, 42 and 50 may be applied to respective differentiators 52, 54 and 56 to derive the velocity in the respective directions, $dx/dt$, $dy/dt$ and $dz/dt$. The outputs of these may be applied to respective differentiators 58, 60 and 62 to derive the accelerations in the respective directions, $d^2x/d^2$, $d^2y/d^2$ and $d^2z/dt^2$.

The relationship between slant range and counting rate can best be determined empirically, as it depends upon many factors not readily computed. The relationship is determined for each particular system set up. Once the relationship is determined, the computer can be set up in a manner well-known in the art so that for a given input in counting rate an output position or voltage is determined indicating slant range. Once at least three slant ranges are determined, computers well-known in the art can be utilized to determine the three coordinates defining the position of the source 12 and missile 10. Where the missile travels substantially vertically, the particular arrangement shown in FIGURES 2 and 3 is particularly simple and effective.

As is noted above, there is a decrease in counting rate with range; that is, the rate falls off exponentially because of the absorption of gamma rays and also falls off in accordance with the inverse square law because of the dispersion of the gamma rays in all directions. It has previously been thought substantially impossible to make a position determining system as here described because of the very large amount of radioactive material necessary, which would be both prohibitively expensive and hazardous. However, the present invention takes advantage of the build-up factor. The detectors of the present invention detect not only the primary gamma rays emitted from the source and reaching the detectors directly but also gamma rays, produced by gamma rays starting off in other directions, that are scattered back to reach the detector. This build-up factor reduces the needed size of the source by many times.

At the same time, a preferred form of the invention utilizes a source that can be turned on and off to reduce the hazard. As a matter of economy and simplicity of operation, cobalt 60 is a preferred source of gamma rays useful in the present system. However, depending upon the detectors used and the geometry, a very large source may be necessary requiring particular handling techniques. Where cobalt 60 is used, it is preferred that the source be surrounded by heavy shielding material until lift-off. The source is preferably mounted some distance from the capsule occupied by astronauts in order that the astronauts be shielded from the source by the body of the missile.

A preferred source is a convertible source that can be turned on and off, this source producing bremsstrahlung. In this instance, the radioactive material is beta active. Beta rays are not so penetrating as gamma rays and can be completely shut off with a moderate amount of shielding material. Where this shielding material has a relatively low atomic number, relatively little secondary radiation is produced, and the source is substantially shut off, while the beta emitter is contained in its shield. Such a source is illustrated in FIGURE 4. Beta active material 64 is surrounded by a beta shield 66 of low atomic number. When it is time for lift off, the source can be turned on by pulling pin 68, as by remote operation of a solenoid, to release the beta source 64 which is then pushed out of the shield 66 by a spring 70 into a target 72 which is of material having a relatively high atomic number. The beta rays striking this target material produce bremsstrahlung in substantial quantities. Bremsstrahlung is detected by the detectors and the counting rates used to compute the position of the source and missile.

To further reduce the amount of radioactive material required, it is preferred to use very sensitive detectors. The sensitivity of the detectors can be increased by combining detectors; that is, a plurality of scintillation counters may be placed at each station to detect the radiation. In this way, very high counting rates may be achieved. In order not to overload the accumulator and read-out circuits with very high counting rates, particularly where scalers are used, it is preferred that the outputs of all the scintillation counters not be simultaneously applied to the same accumulator. As shown in FIGURE 5, it is preferred that the outputs of the elemental scintillation counters 14a, 14b, 14c, 14d be applied to respective scalers 74a, 74b, 74c, 74d, each of which operates to produce a single output pulse to the accumulator and read-out circuit 30 after a predetermined number of input pulses, such as 100. At the same time, the output pulse may be made sharper than the pulses from the elemental scintillation counters so that separate pulses may be more readily appreciated by the accumulator and read-out circuits 30, 32, 34 and 36.

While a preferred embodiment of the invention has been shown and described, various modifications thereof are within the scope of the invention, which is limited only by the claims. For example, although a visual read-out is shown and described, the read-out indication may be in the form of signals used to control the flight of the missile or to project its flight path to determine where it is going. Further, although the preferred form of the invention, as described, relates to three measurements of the intensity of the radiation from the missile, other parameters or characteristics can be measured within the scope of this invention, e.g., the direction whence the radiation is directed. The three measurements need not be of the same characteristic. The important point is that three different measurements each be made of a characteristic of the radiation that relates to the relative location of the missile, preferably simultaneously or at least before the missile has moved so far that the three measurements do not relate to the same position of the missile.

What is claimed is:

1. A position indicating system for indicating the instantaneous position of a body moving in space comprising radioactive material affixed to said body for effectively producing a single source of penetrative radiation, means independent of said body and responsive to said single source of penetrative radiation for making three independent and different measurements of said source of penetrative radiation at a plurality of widely separated points by deriving therefrom a total of at least three independent signals, and computer means responsive to said independent signals for indicating in three coordinates the instantaneous position of said moving body in space relative to a reference datum.

2. A position indicating system for tracking a body moving in space comprising radioactive material affixed to said body for effectively producing a single source of penetrative radiation, means independent of said body and responsive to said single source of penetrative radiation for making at least three simultaneous independent and different measurements of said single source of penetrative radiation at a plurality of widely separated points by deriving therefrom a total of at least three independent signals, and computer means for combining said independent signals to derive separate indications of three coordinates identifying the instantaneous position of said moving body in space relative to a reference datum.

3. A position indicating system for tracking a body moving in space comprising radioactive material affixed to said body for effectively producing a single source of penetrative radiation, at least three radiation detectors independent of said body and each responsive to said single source of penetrative radiation for making an independent measurement of radiation intensity at a respective one of at least three noncollinear points spaced from said body by deriving an independent signal systematically related to the intensity of said source of penetrative radiation at said respective one of said points, and computer means for combining said independent signals to derive separate indications of three coordinates identifying the instantaneous position of said moving body in space relative to a reference datum.

4. A position indicating system for tracking a body moving in space comprising radioactive material affixed to said body for effectively producing a single source of penetrative radiation, at least three widely spread radiation detectors independent of said body and each responsive to said single source of penetrative radiation for making an independent measurement of radiation intensity at a respective one of at least three noncollinear coplanar points spaced from said body by deriving an independent signal systematically related to the intensity of said source of penetrative radiation at said respective one of said points, and computer means for combining said independent signals to derive separate indications of three coordinates identifying the instantaneous position of said moving body in space relative to a reference datum, said computer means including means for additively combining at least two of said signals to derive an indication of the displacement of the body from the plane of said points, and means for differentially combining at least two of said signals to derive an indication of the displacement of the body parallel to said plane.

5. A position indicating system for tracking the early part of the trajectory from its launching pad of a missile carrying radioactive material producing penetrative radiation, said system comprising four radiation detectors located at the corners of a square having its center at the pad and lying in a plane substantially perpendicular to the initial trajectory of said missile, each of said detectors being responsive to said penetrative radiation for making an independent measurement of radiation intensity at a respective one of said corners by deriving an independent signal systematically related to the intensity of said penetrative radiation at said respective one of said corners, and computer means for combining said independent signals to derive separate indications of three coordinates identifying the instantaneous position of said moving body in space relative to a reference datum.

6. A position indicating system for tracking the early part of the trajectory from its launching pad of a missile carrying radioactive material producing penetrative radiation, said system comprising four radiation detectors located at the corners of a square having its center at the pad and lying in a plane substantially perpendicular to the initial trajectory of said missile, each of said detectors being responsive to said penetrative radiation for making an independent measurement of radiation intensity at a respective one of said corners by deriving an independent signal systematically related to the intensity of said penetrative radiation at said respective one of said corners, and computer means for combining said independent signals to derive separate indications of three coordinates identifying the instantaneous position of said moving body in space relative to a reference datum, said computer means including means for additively combining at least two of said signals to derive an indication of the displacement of the missile from the plane of said square, and means for differentially combining the signals from each pair of diagonally opposite detectors to derive indications of the displacement of the missile parallel to straight lines between each of said pairs.

7. A position indicating system for tracking the early part of the trajectory from its launching pad of a missile carrying radioactive material affixed to said missile for producing penetrative radiation, at least three radiation detectors independent of said missile and each responsive to said penetrative radiation for making an independent measurement of radiation intensity at a respective one of at least three noncollinear points spaced from said missile by deriving an independent signal systematically related to the intensity of said penetrative radiation at said respective one of said points, computer means for combining said independent signals to derive separate indications of three coordinates identifying the instantaneous position of said moving missile in space relative to a reference datum, and means at the pad for measuring displacement of said missile therefrom directly after lift-off.

8. A position indicating system for tracking a missile moving in space comprising radioactive material affixed to said missile for producing penetrative radiation, means inhibiting the emission of said penetrating radiation prior to lift-off, means independent of said missile and responsive to said penetrative radiation for making three independent and different measurements of said penetrative radiation by deriving respective independent signals, and computer means for combining said independent signals to derive separate indications of three coordinates identifying the instantaneous position of said moving missile in space relative to a reference datum.

9. A position indicating system for tracking a missile moving in space comprising radioactive material affixed to said body and emitting beta rays, target means formed of material emitting penetrative radiation when exposed to said beta rays, shielding means for normally stopping beta rays emitted from said radioactive material prior to lift-off and formed of material emitting relatively little penetrative radiation when exposed to beta rays, means for removing said shielding means from stopping said beta rays and exposing said target means to said beta rays, means independent of said body and responsive to said penetrative radiation for making three independent and different measurements of said penetrative radiation emitted from said target means by deriving respective independent signals, and computer means for combining said independent signals to derive separate indications of three coordinates identifying the instantaneous position of said moving missile in space relative to a reference datum.

10. A position indicating system for tracking a body moving in space comprising radioactive material affixed to said body for producing penetrative radiation; at least three radiation detectors independent of said body, each of said detectors being responsive to said penetrative radiation for making independent measurements of radiation intensity at a respective one of at least three noncollinear coplanar points spaced from said body, and each of said detectors comprising a plurality of photomultipliers each for sensing scintillations produced by said penetrative radiations at said respective one of said points and producing first electrical pulses in response thereto, a plurality of scalers each responsive to said first electrical pulses from less than all of said photomultipliers and producing second electrical pulses upon receipt of a predetermined number of first electrical pulses, and means responsive to said second electrical pulses from all of said scalers for deriving an independent signal systematically related to the intensity of said penetrative radiation at said respective one of said points; and computer means for combining said independent signals to derive separate indications of three coordinates identifying the instantaneous position of said moving body in space relative to a reference datum.

References Cited by the Examiner

UNITED STATES PATENTS

| | | | |
|---|---|---|---|
| 2,767,326 | 10/1956 | Stratford | 250—108 X |
| 2,797,333 | 6/1957 | Reiffel | 250—106 X |
| 2,821,636 | 1/1958 | Jefferson | 250—108 X |
| 2,895,670 | 7/1959 | Newell | 244—14 X |
| 2,930,545 | 3/1960 | Houle et al. | 244—14 |
| 3,091,463 | 5/1963 | Cohen et al. | 250—71.5 X |

References Cited by the Applicant

Applied X-Rays, by George L. Clark, 3rd edition, McGraw-Hill Book Company, Inc., New York, 1948, pp. 139–141.

RALPH G. NILSON, *Primary Examiner.*

ARCHIE R. BORCHELT, *Examiner.*

UNITED STATES PATENT OFFICE
CERTIFICATE OF CORRECTION

Patent No. 3,291,987                      December 13, 1966

Henry R. Chope

It is certified that error appears in the above identified patent and that said Letters Patent are hereby corrected as shown below:

Column 1, line 23, "range at" should read -- range and at --. Column 3, line 14, "to" should read -- and --. Column 4, line 17, "$r_2 \; r_3$" should read -- $r_2$, $r_3$ --. Column 5, line 36, $d^2x/d^2$, $d^2y/d^2$       should read     $d^2x/dt^2$, $d^2y/dt^2$ Signed and sealed this 28th day of July 1970.

SEAL)
Attest:

Edward M. Fletcher, Jr.                      WILLIAM E. SCHUYLER, JR.
Attesting Officer                             Commissioner of Patents